(12) United States Patent
Andersen et al.

(10) Patent No.: US 10,047,721 B2
(45) Date of Patent: Aug. 14, 2018

(54) PITCH GEAR (75) Inventors: Jesper Lykkegaard Andersen, Hornslet (DK); Anton Bech, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1296 days.

(21) Appl. No.: 13/312,135

(22) Filed: Dec. 6, 2011

(65) Prior Publication Data

US 2012/0148411 A1 Jun. 14, 2012

Related U.S. Application Data (60) Provisional application No. 61/420,936, filed on Dec. 8, 2010.

(30) Foreign Application Priority Data

Dec. 8, 2010 (GB) .................................. 1020834.6

(51) Int. Cl.
F03D 7/02 (2006.01)
F03D 80/50 (2016.01)

(52) U.S. Cl.
CPC ........... F03D 7/0224 (2013.01); F03D 80/50 (2016.05); *F05B 2260/79* (2013.01);
(Continued)

(58) Field of Classification Search
CPC .... F16C 2300/14; F03D 7/0224; F03D 1/003; F03D 80/50; Y10T 29/49316; F05B 2260/79
(Continued)

(56) References Cited

U.S. PATENT DOCUMENTS

| 301,695 | A | * | 7/1884 | Doeg | ............................... 74/439 |
| 3,243,874 | A | * | 4/1966 | Royer | .............................. 29/893 |
| 3,888,357 | A | * | 6/1975 | Bauer et al. | ..................... 74/448 |
| 2003/0116970 | A1 | * | 6/2003 | Weitkamp et al. | ............. 290/44 |
| 2005/0196280 | A1 | | 9/2005 | Gonzalez et al. | |

(Continued)

FOREIGN PATENT DOCUMENTS

| DE | 19644705 A1 | 4/1998 |
| EP | 2 108 815 | 10/2009 |

(Continued)

OTHER PUBLICATIONS

European Patent Office, Extended European Search Report and Written Opinion, issued in corresponding European Application No. 11192206.8-1607/2463521, dated Jul. 3, 2014, 8 pages.

(Continued)

*Primary Examiner* — Christopher Verdier
(74) *Attorney, Agent, or Firm* — Wood Herron & Evans LLP (57) ABSTRACT

A system for a wind turbine rotor blade, the system includes a pitch system that has a pitch bearing and a wind turbine hub, the bearing being attached to the hub and being attachable to a wind turbine rotor blade, and also including a pitch gear coupled to the pitch system. The pitch gear includes a first discrete segment and one or more other discrete segments, each segment having a plurality of teeth for engaging with and actuator such as a pinion. At least the first segment is held in place by releasable fasteners and extends along the pitch gear by a predetermined amount. The predetermined amount that the first segment extends along the pitch gear is determined based on anticipated wear of the pitch gear.

14 Claims, 7 Drawing Sheets

(52) U.S. Cl.
CPC ........... *Y02E 10/721* (2013.01); *Y02E 10/723* (2013.01); *Y10T 29/49316* (2015.01)

(58) Field of Classification Search
USPC ....... 416/147, 155, 156, 174, 205, 207–209; 74/434, 439, 446–448; 475/149, 150, 475/344; 29/889, 889.1, 889.2, 893, 29/893.1, 893.2, 898.06, 898.061, 29/898.062, 898.063, 898.07
See application file for complete search history.

(56) References Cited

U.S. PATENT DOCUMENTS

| 2009/0220343 | A1 | 9/2009 | Dimascio et al. |
| 2010/0143136 | A1 | 6/2010 | Daniels et al. |

FOREIGN PATENT DOCUMENTS

| EP | 2458200 | A1 | 5/2012 |
| WO | 2007/006301 | | 1/2007 |
| WO | 2008074320 | A1 | 6/2008 |
| WO | 2012072627 | A1 | 6/2012 |

OTHER PUBLICATIONS

Mike McKinney; Combined Search and Examination Report issued in priority Great Britain Application No. GB1020834.6; dated Feb. 28, 2011; 7 pages; Great Britain Intellectual Property Office.
European Patent Office, Official Action issued in Application No. 11 192 206.8 dated Apr. 1, 2015.

* cited by examiner

PITCH GEAR

CROSS-REFERENCE TO RELATED APPLICATIONS

This application claims priority under 35 U.S.C. § 119(a) to Great Britain Application No. 1020834.6, filed Dec. 8, 2010. This application also claims the benefit of U.S. Provisional Application No. 61/420,936, filed Dec. 8, 2010. Each of these applications is incorporated by reference herein in its entirety.

TECHNICAL FIELD

This invention relates to wind turbines and more specifically to a pitch gear arrangement for varying the pitch of a wind turbine blade.

BACKGROUND

Figure 1:
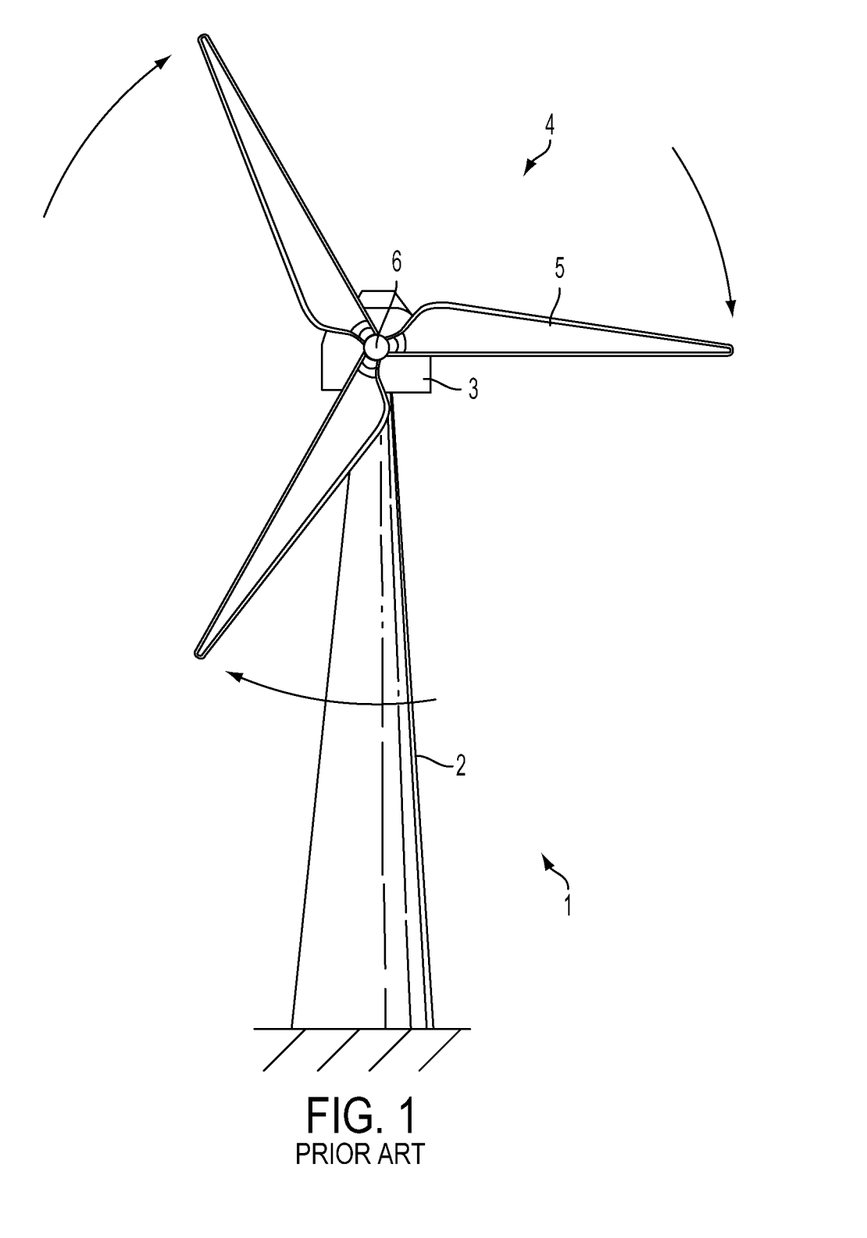
FIG. 1 is a front view of a horizontal axis wind turbine.

FIG. 1 illustrates a wind turbine 1, comprising a tower 2 on which a nacelle 3 is mounted. At least one turbine blade 5 is mounted on a hub 6 to form a rotor 4. The hub 6 is connected to the nacelle 3 through a low speed shaft (not shown) extending from the nacelle front. The wind turbine illustrated in FIG. 1 may be a small model intended for domestic or light utility usage, or may be a large model, such as those that are suitable for use in large scale electricity generation on a wind farm. In the latter case, the diameter of the rotor may be as large as 150 meters or more.

The rotor blades of wind turbines are designed to extract power from the wind by virtue of their aerodynamic shape, and subsequent wind induced rotation. For horizontal axis wind turbines, the blades rotate around a rotor hub attached to a nacelle mounted on a wind turbine tower, and the rotation of the rotor turns a drive shaft connected in turn to a generator which produces electricity. For horizontal axis wind turbines to operate efficiently and extract the maximum power from the wind, the wind turbine nacelle and the axis around which the wind turbine rotor rotates, is angled into the wind to the greatest extent possible, such that the rotational axis of the rotor is aligned with the wind direction.

US patent application US 2005196280 describes a yawing system for a wind turbine, the wind turbine comprising a tower fixed to the ground and a nacelle housing an electric power generator. The tower and the nacelle are joined by the yawing system which allows the orientation of the nacelle with respect to the tower according to the direction of the wind, and requires 360 degrees of rotation to be achieved by the yawing system. The yawing system comprises a gear ring fixed to the tower for rotating the nacelle relative to the tower. The gear ring is divided into gear-toothed circular segments of uniform size.

Figure 2:
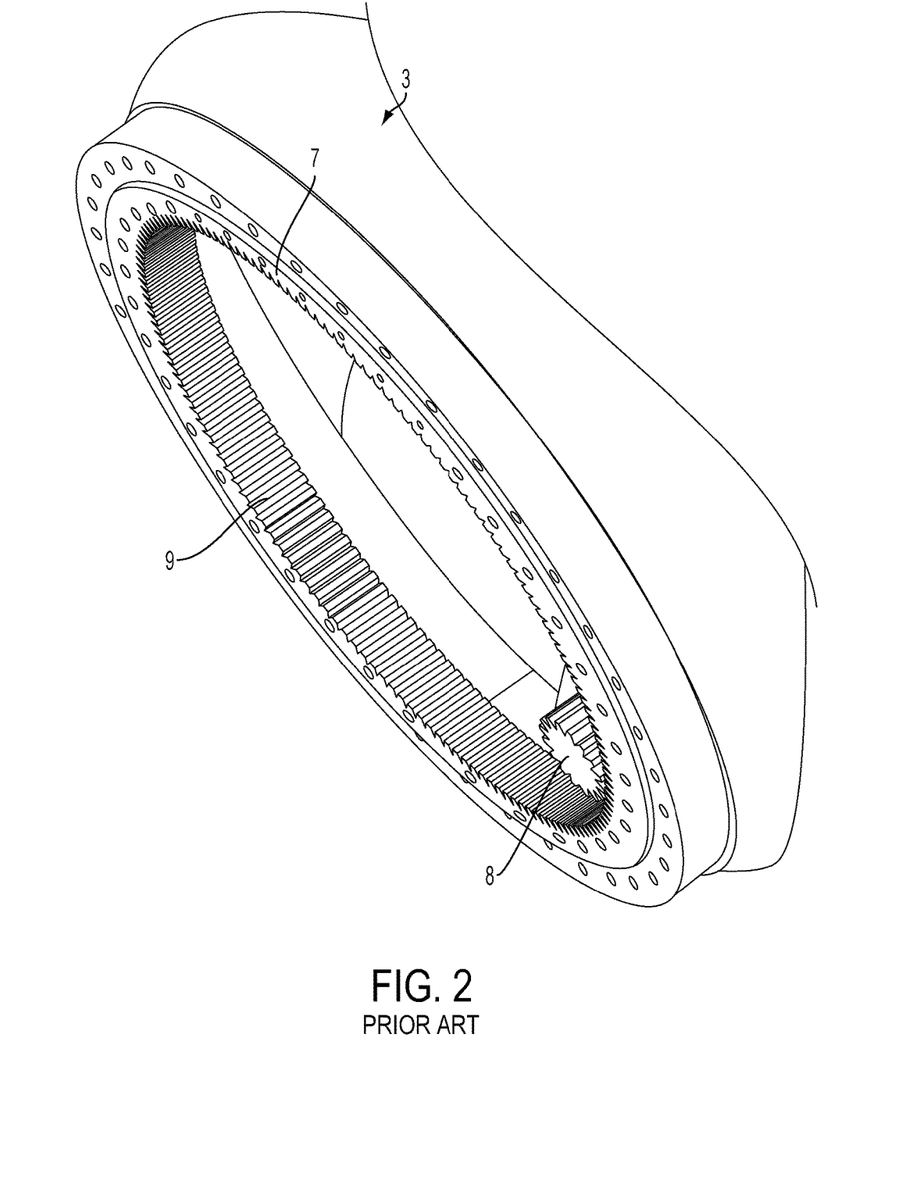
FIG. 2 is a schematic illustration showing a known pitch control system.

Modern wind turbines control the load on the rotor by pitching the blades about their longitudinal axis in and out of the incoming wind. FIG. 2 shows a known pitching arrangement between a hub 3 and a blade (not shown). The pitch bearing 7 is located between the hub and the blade. A gear 9 is formed on the pitch bearing 7 and a torque is applied to the gear to turn the pitch bearing by pinion 8. The pinion is turned by an actuator or motor, such as a hydraulic cylinder or electric motor, to provide the torque for pitching the blade and maintaining it in a given position. Known pitching arrangements such as that of FIG. 2 use a pitch gear ring formed as a single piece extending around the entirety of the bearing circumference.

Pitching of wind turbine blades can be used to achieve two aims. The primary task is to control the angle of attack within what will be called the "operational range" for controlling the power and speed of the rotor when the turbine is being used to extract energy from oncoming wind. Mechanically adjusting the rotor blade pitch angle controls the aerodynamic angle of attack, and thus the input power to the generator, as is well known in the field of wind turbines. The majority of blade pitching takes place between a narrow range of around 5°. For example, if a pitch angle is taken as that between the plane of rotation of the blade tip and the blade tip chord, a pitch of 0° being the pitch at which the chord of a turbine blade tip is parallel with the plane of rotation of the blade tip, the majority of pitching may be performed between −2° and +2°. Taking into account other factors such as power control, a pitching range of around 30° to 35° is typically enough variation for controlling the blade within the operational range sufficiently, this may correspond to pitching the blade from −5° through to 30° if pitch angle is determined as described above. However, the second task of the pitching mechanism is to provide aerodynamic braking for the rotor by pitching the rotor blades fully out of the wind to reduce the lift coefficient as far as possible (known as feathering). This requires a total pitching range of around 90°-100°. The majority of the time during operation, when extracting energy from oncoming wind, the pitching mechanism will be adjusted within the power control or operational range that extends around 30° or perhaps 35° of pitching and in particular in the very narrow range of around 5° to 10°; only a small proportion of the time will the pitching mechanism need to pitch to the feathered or stall position of around 90°.

A unique problem with pitch bearings for wind turbines is that they are not operated like traditional gear systems and must be considered differently from other gear systems such as, for example, yaw systems. The pitch gear goes through long periods of inactivity, in which it is not necessary to change the pitch of the blades. When the blades are pitched, only relatively small rotations are required to control the power and speed of the rotor when the turbine is being used to extract energy from oncoming wind, this being within what will be called the "operational range" for pitching. The result is that the pinion spends most of the time engaged with, and travelling over, a short section of the gear surface. Typically, this equates to around 30°-35° of the gear surface, defined by the angle of a segment of the gear ring, with a particularly high wear section of around 5° to 10°. This leads to accelerated wear, and when the small section of gear covering adjustments in the operational range becomes worn the entire gear must be replaced. Because the gear is formed directly on the blade bearing the entire bearing, or bearing ring, must be replaced, which is expensive and difficult.

We have appreciated that the gear rings on turbine pitch control systems are subject to fatigue during use and that an improved arrangement for mitigating against fatigue damage and allowing easy replacement of a gear ring would be advantageous. In particular, we have appreciated that a new type of gear ring would be advantageous that can be installed in a wind turbine and, after installation, can be easily repaired when required

SUMMARY

Aspects of the invention are defined in the independent claims to which reference should now be made. Advantageous features are set forth in the dependent claims.

Embodiments of the invention provide a system or apparatus for a wind turbine rotor blade, the system/apparatus comprising a pitch system comprising a pitch bearing and a wind turbine hub, the bearing being attached to the hub and being attachable to a wind turbine rotor blade, and also including a pitch gear coupled to the pitch system, by coupling to a component thereof. The pitch gear can be coupled to the pitch bearing, in which case the pitch bearing and pitch gear can be considered as a sub-assembly to which a blade and hub are connectable. Alternatively, the pitch gear can be coupled to the hub, which could be considered as a sub-assembly to which the pitch bearing is connectable.

The pitch gear, such as a gear ring, comprises a first discrete segment and one or more other discrete segments, each segment having a plurality of teeth for engaging with an actuator such as a pinion.

At least the first segment is attached, or held in place, by releasable fasteners, being attached to or coupled to a component of the pitch system such as the hub or bearing, and extends a predetermined amount along the circumference of the pitch gear. This predetermined amount may be determined based on anticipated wear of the pitch gear. Anticipated wear relates to wear on the pitch gear caused by the pinion moving over the pitch gear surface. In particular, as described herein, the pinion spends the majority of the time, when in motion, moving over a relatively narrow range of teeth on the pitch gear. A determination is made of the most likely portions or locations of the pitch gear that will be subjected to higher wear than other portions based on the regions most frequently travelled over by the pinion. The predetermined amount that the first portion extends may thus be considered an estimate, anticipation or predetermination of a high wear region determined before wear to that region is experienced by the pitch gear when in operation in a turbine. The first segment can thus be sized to extend over a region or portion of the pitch gear expected to be subjected to high wear, or higher wear than the remainder of the pitch gear.

In one embodiment, each segment abuts one or more other segments to form a continuous gear surface over at least a portion of the circumference of the gear. Moreover, the gear surface may cover less than the total circumference of the gear.

In one embodiment, the first segment of the gear extends along a smaller circumferential distance than the total circumferential distance of the other segments of the gear. Ideally, the first segment extends along the gear by an amount arranged to cover those sections of the gear that are frequently in contact with the pinion, and may therefore be arranged to correspond to the range of rotation required of the blades within the operational range when the turbine is extracting energy from oncoming wind, such that in use the pinion engages only with the first segment when the turbine blades are pitched within the operational range. The first segment may extend along the gear by an amount less than the range required to cover the entire operational range, and may instead only extend around a portion of it, such as the most used portion.

The first segment may extend along the gear to define a segment having an angle, defined between the intersecting radii passing through the ends of the segment, of between 20° and 60°. More preferably the segment has an angle of between 30° and 50°. More preferably still, the first segment has an angle of between 30° and 35°. Embodiments may also use smaller segments, such as between 4° and 10°. The smaller segment may be positioned such that it is contacted by the pinion when the blade is being pitched between the −2° and +2° position if the 0° pitch is taken to be the pitch at which the chord of a turbine blade tip is parallel with the plane of rotation of the blade tip. The majority of pitching is performed between −2° and +2°.

Where multiple actuators or pinions are used on a common gear, a "first" segment as described above can be positioned to contact each pinion.

Some or all of the gear segments may be coupled to the hub or bearing by removable fasteners, such as bolts or clamps, to allow worn segments/sectors to be replaced.

The first segment may be comprised of a different material to the other segments, whereby the material of the first segment has a higher hardness than the material used for the other segments and is therefore harder wearing. The different segments may therefore be defined by the materials making the segment.

The gear may be coupled to the bearing or to the hub by a flange that is connectable to the pitch bearing and arranged to support the gear between the axis of rotation of the bearing and the bearing circumference in use. The flange, in use, may extend in a direction substantially perpendicular to the axis of rotation of the bearing. The flange may comprise a first portion and a second portion, and in use the first portion may connect to the bearing and support the second portion such that the distance between the second portion and the blade tip is smaller than the distance between the bearing and the blade tip, along the bearing axis, and the second portion extends into the space between the circumference of the bearing and the axis of rotation of the pitch bearing.

A wind turbine may be formed using a system/apparatus as described herein according to embodiments of the invention.

Embodiments of the invention may provide a method of manufacturing a system/apparatus or pitch sub assembly of the sort described herein. The method comprises providing a pitch bearing for effecting relative rotation between a turbine hub and blade. A first discrete segment of a pitch gear, having a plurality of teeth for engaging with a pinion, is formed. The first discrete segment is formed such that it extends along a predetermined amount of the pitch gear. After forming the segment it is coupled to a component of the pitch system, such as the hub or the bearing, along with the remainder of the pitch gear. As described herein, the remainder of the pitch gear comprises at least one further discrete segment having a plurality of teeth for engaging with a pinion. At least the first discrete segment is mounted or coupled to the component of the pitch system, such as the hub or the bearing, using releasable fasteners. Some or all of the at least one further discrete segments may also be coupled or mounted in the same manner as the first segment.

In one embodiment, the amount that the first discrete segment extends along the pitch gear is based on anticipated wear of the pitch gear. The method may further include the step of determining, based on anticipated wear of the pitch gear, the amount along the pitch gear the first discrete segment should extend.

The manufacture of the system/apparatus or pitch sub assembly is performed before the pitch gear is installed in the wind turbine, and before the pitch gear is used by the wind turbine or pitch system to adjust the pitch of a blade.

Embodiments of the invention may further provide a method of manufacturing a wind turbine rotor or a wind turbine of the sort described herein. The method comprises providing a system/apparatus, pitch sub assembly or pitch gear of the sort described herein and installing the system/apparatus, pitch sub assembly or pitch gear into a wind turbine rotor or wind turbine. The system/apparatus, pitch sub assembly or pitch gear is installed as a complete unit prior to use of the pitch gear by the wind turbine rotor or wind turbine.

BRIEF DESCRIPTION OF THE DRAWINGS

Embodiments of the invention will now be described, by way of example only, and with reference to the accompanying drawings, in which.

DETAILED DESCRIPTION

Figure 3:
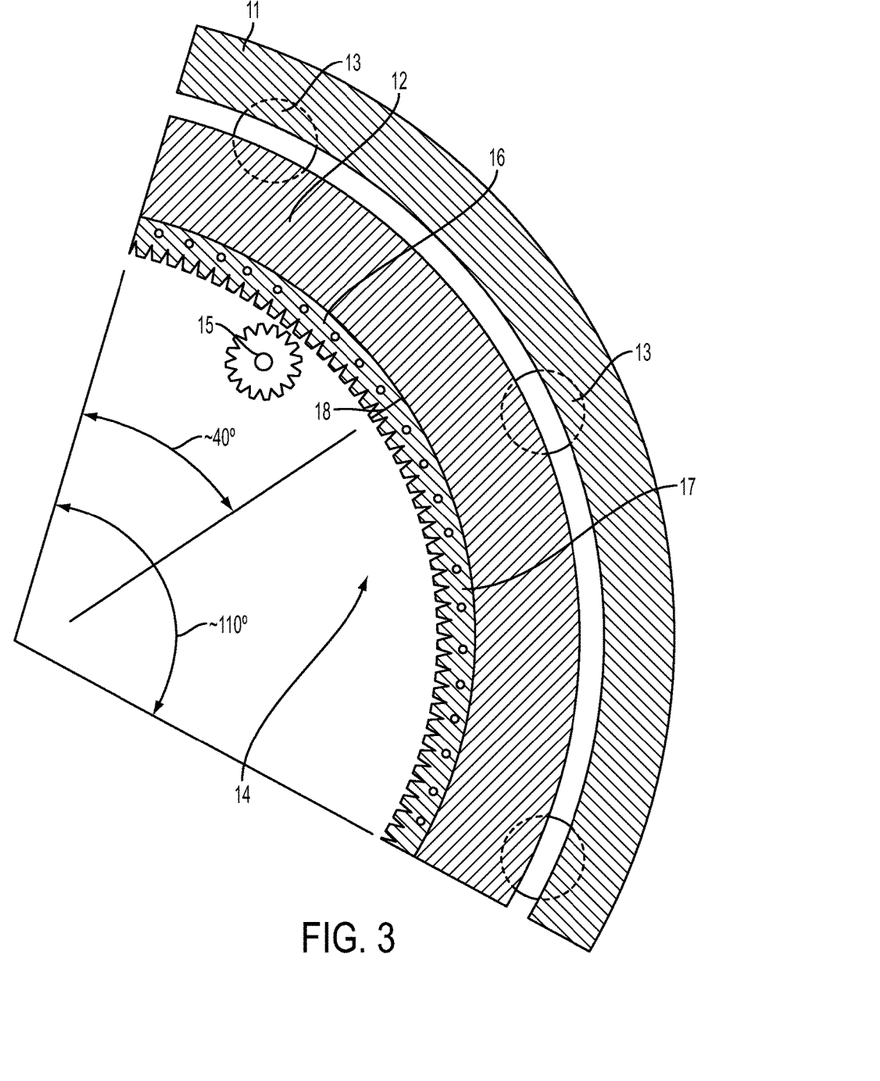
FIG. 3 is a cross section of a portion of a gear ring according to an embodiment of the invention.

FIG. 3 shows a section of a blade pitch bearing according to an embodiment of the present invention. The blade pitch bearing comprises first and second rings 11 and 12, the rings sharing a common centre and being arranged with the first ring surrounding the second ring. The bearing includes contact rollers 13 between the first and second rings to allow them to rotate relative to each other. The second or inner ring 12 has formed at its inner circumference a gear 14. The gear, in this instance a gear "ring" engages with a pinion 15 which is driven by an actuator or motor such as an electric motor or hydraulic motor. A blade is coupled to one of the rings of the bearing, usually the inner ring 12, and the other ring is coupled to the hub of the wind turbine such that the rotor blade can rotate about its longitudinal axis relative to the hub.

The gear ring 14 comprises at least two sectors or segments. A first sector 16 extends around the inner circumference of the inner pitch bearing ring 12 by a certain number of degrees. A second sector 17 is located next to the first sector 16, and may abut it at a joint 18. The extent to which each segment extends around the circumference can be defined by the angle formed between the radii connecting each end of the segment to the rotational axis of the bearing as shown in FIG. 3. The first sector covers an angle around the inner circumference of the inner pitch bearing corresponding to the amount of rotation required of the blades within the operational range. The first sector may extend around the inner circumference of the inner pitch bearing ring by an angle of between 4° to 60°, preferably between 30° to 50°, more preferably around 40°, and even more preferably between 30° and 35°. The second sector may extend around the inner circumference by an angle of between 40° to 90°, preferably between 50° to 80° and even more preferably around 70°. It is possible for further sectors to be provided to give coverage of up to 360°, but it is not usually necessary for the ring gear to extend around the entirety of the circumference to achieve the required amount of pitching. Although each sector could be subdivided into further sectors, it may be desirable to use as few sectors as possible because the joint between neighbouring sectors is a potential weak point.

Turbine blade pitching systems spend a large proportion of time during operation being pitched between the −2° and +2° position. Therefore, a more targeted arrangement could provide a segment of between 4° and 10° positioned such that it is contacted by the pinion when the blade is pitching between the −2° and +2° positions.

In order to rotate the rotor blade about its longitudinal axis the pinion 15 can be rotated by a motor. The pinion engages with the gear ring 14 and applies a force to it, causing the gear ring and bearing ring 12 to rotate, along with the blade, relative to the bearing ring 11 and the hub. The pinion may rotate either clockwise or anti-clockwise depending on whether the pitch angle of the blade is to be increased or decreased.

The rotor blade and gear are aligned such that the relatively narrow range of pitch required in the operational range necessary for controlling power is performed by the pinion acting on the first sector of the gear ring. The first sector of the gear ring may therefore also be known as the power control sector of the bearing ring. In the event that the blades need to be pitched to a greater extent than usually required in the power control range, such as during feathering, the pinion will pass over the joint 18 and act on the second sector. The number of degrees covered by a particular sector, i.e., the angle defined between the intersecting radii passing through the segment ends, usually directly corresponds to the number of degrees through which the rotor blade can be pitched using that sector.

It is possible to provide multiple pinions on a single gear ring to reduce the amount of torque each pinion must deliver and to spread the load around the gear. The pinions may be distributed uniformly around the gear circumference, such as three pinions each positioned at locations 120° apart. In such examples, the pitch gear can be arranged such that each pinion contacts a different "first" sector when operating in the operational range. Each first sector, as described above, would extend around the circumference of the pitch bearing by a certain number of degrees. A corresponding second sector would be located next to each first sector, such as abutting it at a joint. The first sector would cover an angle around the pitch bearing corresponding to the amount of rotation required of the blades within the operational range, or a smaller angle, such that each first segment engages with a given pinion over those pitch ranges in which the turbine blade frequently operates.

The gear ring sectors may be attached to the bearing by any suitable removable fasteners. For example, the gear ring may include flanges on the top and bottom surfaces that extend over the inner bearing ring and are then fixed in place with bolts, with corresponding holes being formed in the bearing ring to receive the bolts. As an alternative, the gear surface may have recesses formed therein to receive releasable fasteners which would pass directly into the inner ring, such as in a radial manner. For example, screws or bolts may pass through holes or recesses formed between teeth and into corresponding holes or recesses in the bearing.

Since the first sector is arranged to be the sector of gear ring that is exposed to most use, with the pinion passing over that section a greater number of times than other parts of the gear ring, it is more likely to be damaged by wear. This leads to unequal distribution of wear over the gear ring. Because, in embodiments of the present invention, the first sector is formed separately from the remainder of the gear ring, rather than having to replace the entire gear ring, it is possible to simply replace the first portion that is exposed to greater wear.

Many different materials may be used for making a gear ring. These may include steel, stainless steel, heat treated stainless steel, carbon steel, chromium steel, manganese steel, molybdenum steel, nickel-chromium steel, aluminium, bronze, cast iron, plastic or nylon. Some materials offer strength or hardness benefits and are more resistant to wear but may be more expensive, whilst others may be less expensive but also less hard wearing. Embodiments of the present invention may use a first material for the first sector and a second material for the second sector. For example, the first sector 16 may be comprised of heat treated stainless steel whereas the second sector 17 may be comprised of regular steel. This means that the tougher material is concentrated in the power control sector in which it is most required. Therefore, the gear ring could be directly bonded to, made integral with, or formed directly on the bearing but with the segment to be subjected to higher wear being formed of a harder material to increase the life span of this section and thus the entire gear ring. Alternatively, different portions or sectors made of different materials may be attached to the bearing by removable fasteners as described above.

Figure 4:
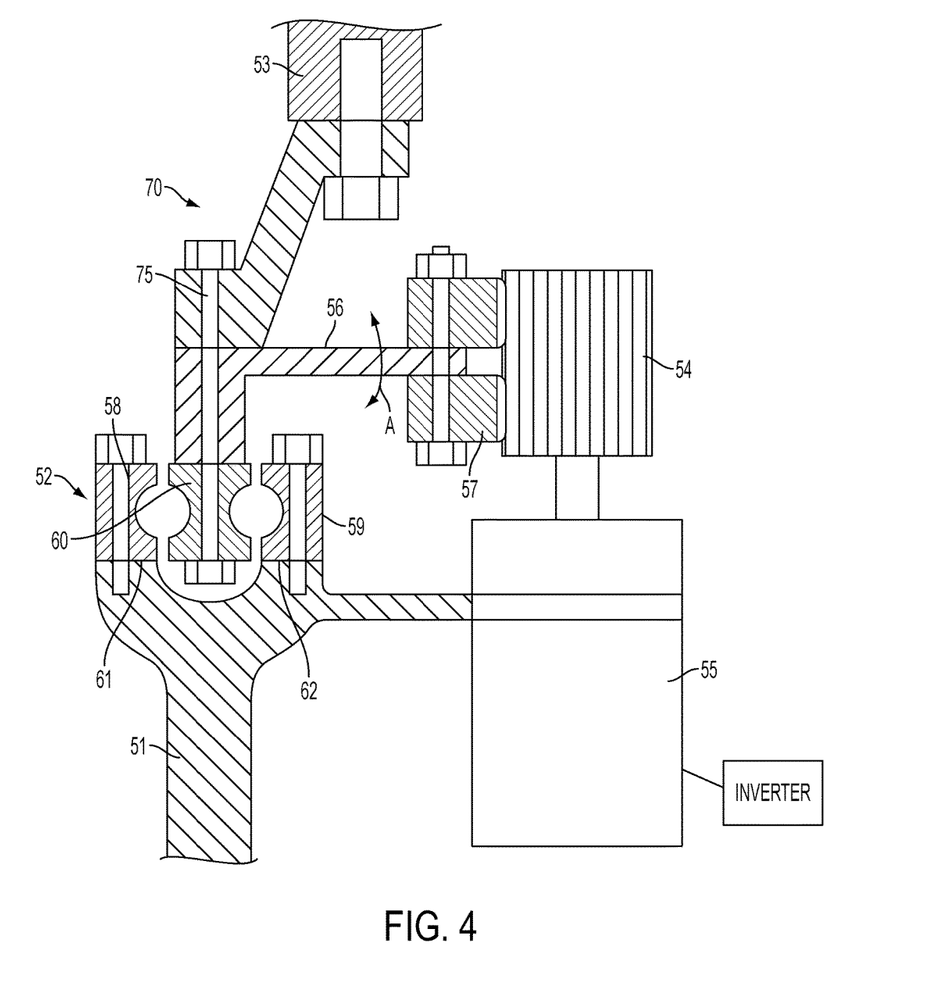
FIG. 4 is a cross section of a gear ring according to an embodiment of the invention, including a gear ring support arrangement.

FIG. 4 shows an alternative embodiment in which the gear ring is mounted on a flange, rather than being mounted directly onto the pitch bearing. A hub 51 is attached to a pitch bearing 52 and a blade 53 is coupled to the bearing by a blade coupling arrangement 70 comprising a number of members. A pitch ring actuator system is provided, comprising an AC synchronous motor or hydraulic motor 55 for generating a torque, and a pinion 54 and a gear ring 57 to transmit the torque to the bearing 52 to rotate the turbine blade about its longitudinal axis. The pitch ring actuator system is coupled to the blade coupling arrangement 70 by a mounting flange 56 attached to one of the members of the blade coupling arrangement.

The hub 51 is attached to a pitch bearing 52 of the sort described in PCT application no. WO2007/006301. The blade 53 is attached or coupled to the pitch bearing 52. The pitch bearing includes at least one outer ring 58, at least one centre ring 60 and at least one inner ring 59. The hub comprises a mount area for each of the blade units, the mount area comprising at least two concentric load transferring surfaces 61/62 for attaching the blade unit via the at least one pitch bearing. The load transferring surfaces may be separated by at least one groove. The pitch bearing is attached to the hub at the load transferring surfaces by fasteners such as screws, bolts or studs.

The blade may be attached to the centre ring of the pitch bearing via the blade coupling arrangement 70 using fasteners such as screws, bolts or studs which may extend into the groove between the load transferring surfaces 61/62. The arrangement provides a direct path for the fasteners to pass through the bearing such that the fasteners may be substantially straight, such as a straight bolt 75 fastened by a nut either at the bearing end or the blade coupling flange end.

The blade coupling arrangement may include a blade coupling flange. The blade coupling flange defines an access space for receiving at least a portion of the rotor blade fasteners, this portion allowing access to the fasteners so that they can be unfastened and removed/replaced. The blade coupling flange comprises a bearing coupling portion for coupling to the pitch bearing 52 and a blade coupling portion for coupling to the rotor blade. An intermediate section is located between the bearing coupling portion and the blade coupling portion. The blade coupling flange is arranged such that, in use, the blade coupling portion is spaced from the hub pitch bearing along a longitudinal direction of the blade. The blade coupling flange defines one or more access spaces for fasteners for attaching the rotor blade to the blade coupling portion and for attaching the bearing coupling portion to the bearing. Such an arrangement allows the blade to be mounted onto the middle/intermediate ring of a three ring bearing. In one embodiment, the blade is mounted directly to the blade coupling flange. In use, the one or more access spaces are located between the bearing and the blade, particularly with reference to the longitudinal direction parallel to the axis of rotation of the bearing. The blade coupling flange may define one or more internal access spaces for the fasteners attaching the rotor blade to the blade coupling portion and one or more external access spaces for the fasteners attaching the bearing coupling portion to the bearing, or alternatively one or more external access spaces for the fasteners attaching the rotor blade to the blade coupling portion and one or more internal access spaces for the fasteners attaching the bearing coupling portion to the bearing. In some embodiments, because the blade coupling flange spaces the blade coupling fastener from the hub bearing in a longitudinal direction of the blade it is possible to locate the blade fastener, or a portion thereof, over the hub bearing; that is, the blade fastener can be located over the hub bearing when viewed along a longitudinal direction of the blade. The intermediate section spaces the blade coupling portion from the hub pitch bearing along the longitudinal direction of the blade, and also spaces the blade coupling portion from the bearing coupling portion. Additionally, the blade coupling portion is offset relative to the bearing coupling portion in a radial direction of the hub pitch bearing axis of rotation, which may be achieved by the intermediate section extending at an angle to the axis of rotation of the hub pitch bearing, the blade coupling flange, or the intermediate section extending along a line passing through the centre of the pitch bearing structure, between the inner and outer bearing rings, and through the centre of lift of the blade. The angle at which the intermediate section extends may be uniform along its length creating, for example, a funnel or conical shaped section. The blade coupling flange may be arranged to provide a smooth, even or flush surface between the blade coupling flange and the blade. The access spaces created by the blade coupling flange, and the extension of the blade coupling flange in the longitudinal direction of the blade, allow the blade fasteners to be supported in a position between the bearing and the blade so that, in use, there is a clearance between the bearing and the blade fastener along the longitudinal direction parallel to the axis of rotation of the bearing. The blade coupling portion may have a greater dimension in the radial direction than the intermediate section so as to define a portion for receiving the fasteners on or in the blade coupling portion and allowing the fasteners to be substantially straight. The blade coupling flange may be made wholly or partly from the same material used for the hub bearing, such as steel. In other embodiments the bearing coupling portion and the blade coupling portion are attached to the bearing and blade respectively by fasteners and the blade fasteners and the bearing fasteners are coaxial.

As described, embodiments of the invention provide a system for a wind turbine. The system comprises a pitch system comprising a blade pitch bearing and a wind turbine hub, the pitch bearing being attached to the wind turbine hub and arranged to be attachable to a wind turbine rotor blade. The blade pitch bearing serves to pitch the rotor blade relative to the hub. The entire pitch gear assembly, comprising a gear having a gear surface for engaging with an actuator such as a pinion, is releasably coupled to the pitch system, either by coupling to the pitch bearing, or by coupling to the hub, so that the pitch gear, under the action of the actuator, causes relative rotation between the hub and the relevant part of the bearing. Releasably coupling the gear surface to the pitch system can allow easy replacement of the entire gear without requiring the removal of large components such as the bearing.

As mentioned above, embodiments of the invention may include a pitch gear assembly, comprising a gear having a gear surface for engaging with an actuator such as a pinion, which is releasably coupled to the pitch system, either by coupling to the pitch bearing, or by coupling to the hub, so that the pitch gear, under the action of the actuator, causes relative rotation between the hub and the relevant part of the bearing. Releasably coupling the entire gear surface to the pitch system can allow easy replacement of the entire gear without requiring the removal of large components such as the bearing. Although mounting can be performed directly to the bearing, in one embodiment, the pitch system comprises a flange or member 56 for coupling the gear to the pitch bearing, the flange being a projecting support for attaching one component to another. The flange is supported on the pitch system and is arranged to support the gear such that it is separate from, or held away from, the pitch bearing, or the hub, such that, for example, the gear, and gear surface, is supported between the axis of rotation of the pitch bearing and the pitch bearing circumference, specifically between the axis of rotation of the pitch bearing and, in the case of a circular or elliptical bearing, the curved wall of a cylinder passing through the pitch bearing circumference and being parallel to the axis of rotation of the pitch bearing. The flange may extend in a direction substantially perpendicular to the axis of rotation of the pitch bearing. By providing a flange or support to hold it, the gear does not need to be directly attached to, or formed as part of, the components of the pitch system, and particularly the pitch bearing, and can be moved to a location away from the pitch bearing and/or the hub. This allows the pitch gear to be supported away from the bearing or hub in a more convenient location in which it can be easily removed, as well as allowing more design flexibility in deciding where to locate the gear and corresponding pinion.

The flange may comprise a first portion and a second portion, with the first portion connecting to the pitch bearing and supporting the second portion, separating the second portion from the pitch bearing by a distance along a line parallel to the bearing axis so that the second portion is held away from the bearing, further towards the blade tip than the bearing. The second portion then extends into a space between the circumference of the pitch bearing and the axis of rotation of the pitch bearing. This allows the flange to be coupled to a blade mounting arrangement in which a mounting assembly connects a blade to the pitch bearing since the first portion can be part of the mounting assembly, either formed integrally with it or being attachable thereto. This also allows a blade with a pitching system to be mounted on the middle ring of a three ring bearing.

Figure 5:
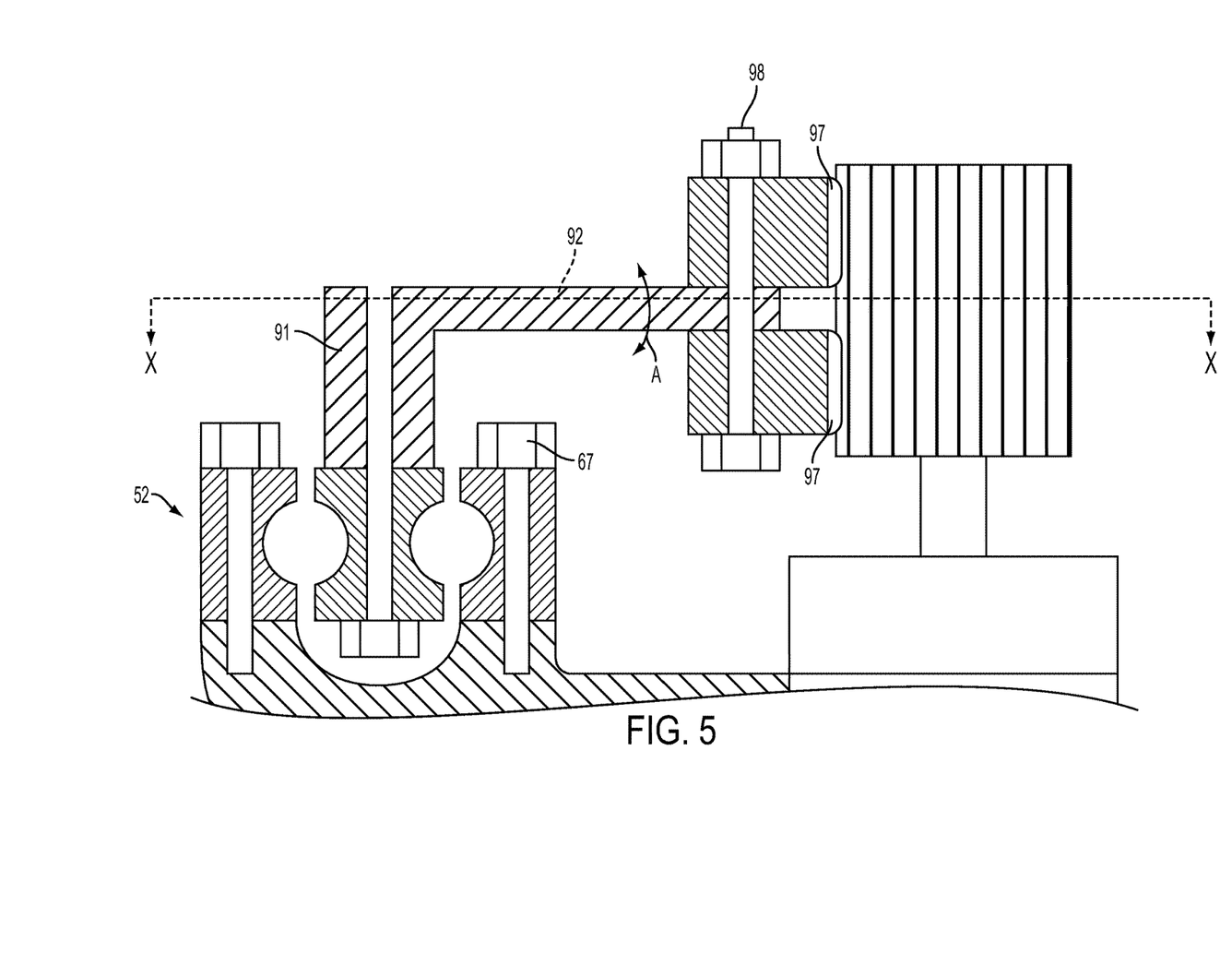
FIG. 5 is an expanded view of the gear ring support arrangement of FIG. 3.

With reference to FIG. 5, which shows an enlargement of the gear ring mounting flange, bearing and gear and pinion arrangement, the gear ring mounting flange comprises a first portion 91 for coupling the flange to the pitch bearing 52, and a second portion 92 extending radially inward towards the axis of rotation of the bearing to which the gear ring is attached. The first portion extends along the direction from the bearing to the blade tip to support the second portion 92 in a position closer to the blade tip than the distance between the blade tip and the bearing. In one embodiment, the second portion extends inwardly at an angle substantially perpendicular to the axis of rotation of the bearing, although it is possible that the second portion extends at an angle greater or less than substantially 90° to provide a conical shape with sloping sides.

The pitch gear may be mounted on the bearing or to the flange using one or more releasable fasteners such as screws or bolts. When using a flange, the gear can then be supported proximate to the inner circumference of the flange, between the flange and the axis of rotation of the bearing. The flange, such as an annulus, may have one or more holes formed therein to allow releasable fasteners 67, such as a nut and bolt, between the bearing and the hub to be adjusted or replaced. The holes can be distributed at a predetermined radius corresponding to the radial position of a fastener between the pitch bearing and a wind turbine hub, and would be sized so as to allow access to the fasteners.

Figure 6:
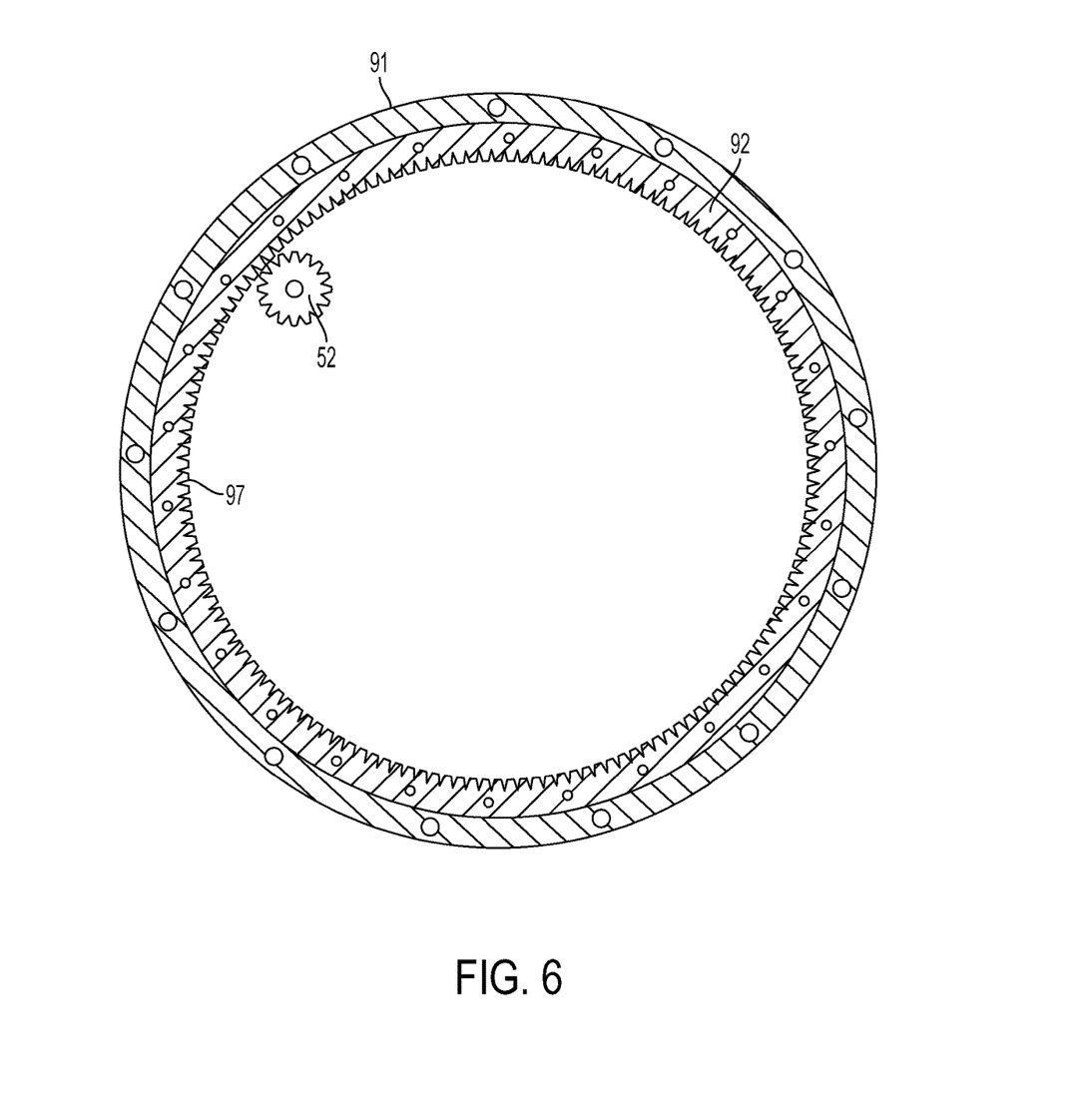
FIG. 6 is a cross sectional view of the gear ring mounting flange, gear ring and pinion along the line X-X, but excluding the gear mounting feature, according to an embodiment of the present invention.

FIG. 6 shows a cross-sectional view of the gear ring mounting flange, gear ring and pinion along the line X-X of FIG. 5, but does not show the attachment assembly 98 described in more detail below. The first portion and second portion of the gear ring mounting flange are shaped as an annulus, centred on the axis of rotation of the pitch bearing. They may be integrally formed as a single piece, but could be bonded together by a suitable method such as welding or using bolts. The dimension of the first portion in the direction of the axis of rotation of the bearing may be greater than the dimension of the second portion such that the second portion is supported at a certain distance further along the axis of rotation of the bearing than the bearing itself in relation to the blade tip. This allows the gear ring mounting flange to couple the gear ring arrangement to the central ring of the three ring bearing. It also ensures that the second portion extends over the nuts 67 attaching the bearing to the hub.

The second portion 92 is attached to the gear ring 97 by an attachment assembly 98. In this embodiment the gear ring assembly is shown as comprising two co-axial gear rings centred on the axis of rotation of the bearing and separated along the axial direction of the bearing. The attachment assembly comprises a bolt and nut to retain the gear rings in position, although the gear rings may be connected to the gear ring mounting flange by any other suitable fasteners. Other embodiments may use a single gear ring or more than two. Alternatively, the pitch gear may be formed integrally with the inner circumference of the gear ring mounting flange. A pinion 54 engages with the one or more gear rings 97. The pinion is driven by a motor, such as an AC synchronous motor or a hydraulic motor. The pinion is attached to the hub 51.

Embodiments of the invention may incorporate two or more gears 97, such as ring gears, that are coupled to the bearing, the ring gears being separated along the axis of rotation of the bearing. Such embodiments may or may not require the coupling flange, as both ring gears can be coupled directly to a pitch system component such as the bearing or hub. One or more pinions 54, coupled to one or more actuators, such as an electric or hydraulic motor, are arranged to engage with one or more of the two or more ring gears and to cause rotation of the rotor blade with the bearing. Having two or more ring gears engaging with a common pinion, or each engaged with separate pinions, to rotate the bearing reduces the weight of the ring gear, since two ring gears separated along the axis of rotation of the bearing can be made lighter than a single ring gear whilst covering the same length along the bearing axis. The two or more ring gears may be mounted so that they rotate about a common centre, for example, with the ring gears being arranged to rotate about the axis of rotation of the bearing and the teeth of each ring gear being aligned with the teeth of the other ring gears along a line substantially parallel to the axis of rotation of the bearing. Where more than one gear rings are used, the joint between a segment and an adjacent segment, such as the first and second segment, on one of the gear rings may be offset from the joint between a corresponding segment and adjacent segment, such as the first and second segment, of the other ring gear. This avoids a high load being simultaneously applied to both joint regions. Furthermore, the gear surface in the region of the joint between two segments can be arranged to reduce the load exerted on the gear surface by the pinion, such as by reducing the height of the gear teeth relative to other gear teeth of the gear surface in the region of the join by machining or grinding them down. In one embodiment, at least one of the two or more ring gears is mounted such that it can rotate relative to the axis of rotation of the bearing independently of the bearing by a small amount, such as 1° to 5° or corresponding to the circumference of the ring gear occupied by a single tooth on the ring gear. This allows for slight variations in the alignment of the two or more gear rings by allowing for some play in the relative positioning of the gear rings. The gear rings may be directly attached to the bearing, such as with releasable fasteners, or may be coupled to the bearing via a flange so that the gear rings are not in direct contact with the bearing. Again, for example, the gear rings are attached to the coupling flange by releasable fasteners to allow for replacement and adjustment of the gear rings or segments thereof.

Since it is not necessary for the blade to be able to pitch through 360° the gear ring mounting flange does not need to extend around the entire circumference of the blade root. Instead, the gear ring mounting flange may extend around only a portion of the circumference of the blade root, the portion covering, for example, substantially the same circumferential segment as the gear ring.

In order to pitch the blade a torque is generated by the shaft of the motor and transferred to the pinion. The pinion rotates and transfers torque to the gear ring causing the gear ring and the attached load of the blade to rotate with the middle ring of the bearing.

The gear ring 97 is comprised of two or more sectors in the same manner as described above. Each sector can be comprised of a different material. The high wearing sectors, over which the pinion passes more frequently, can be replaced more frequently than the other sectors, reducing cost and maintenance burdens.

Figure 7:
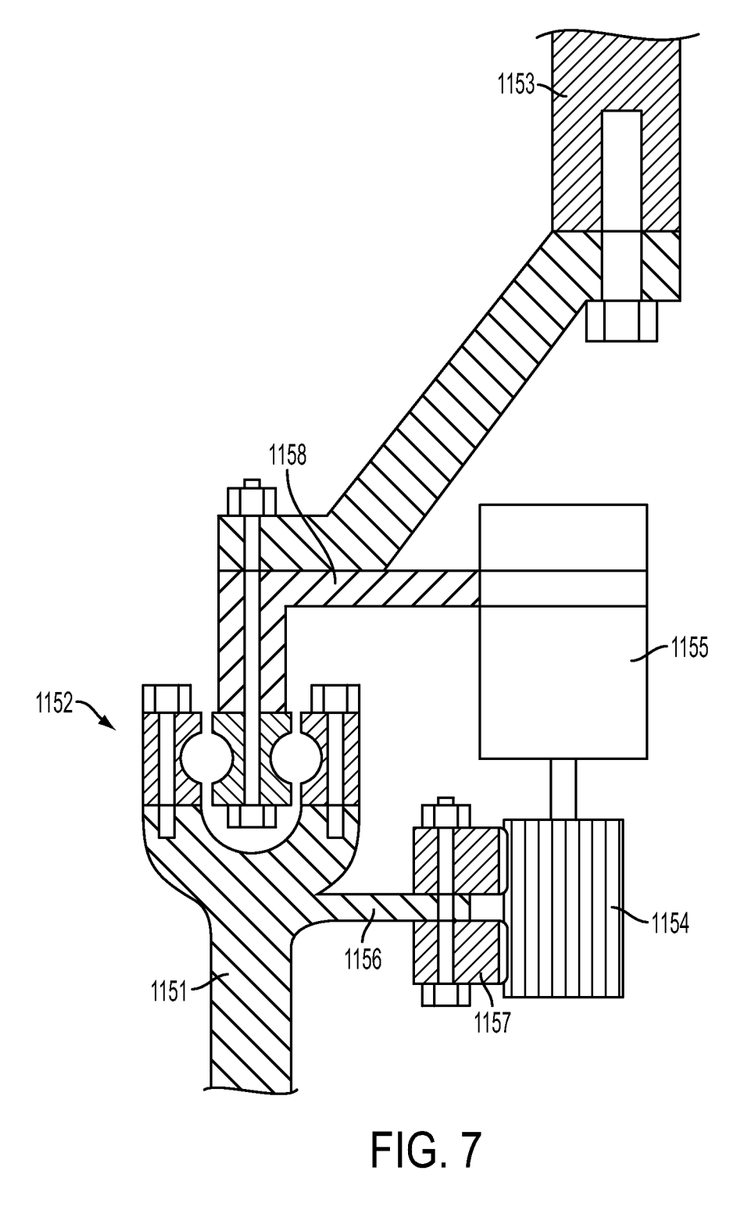
FIG. 7 shows an example of an arrangement in which the pitch gear is coupled to the hub rather than to the bearing.

Examples have been described in which the gear ring is coupled to the bearing, with the driving pinion being coupled to the hub such that the pitch motor's torque is thus transferred to the bearing to cause relative rotation between the blade and the hub. However, it is possible for the gear ring to be coupled to the hub instead, with the pinion being coupled to the bearing. FIG. 7 shows an example of such an alternative arrangement, in which the pinion 1154 is coupled to the bearing 1152 via the motor 1155, which is attached to the bearing by support member or support means 1158. The support means could be attached directly to the bearing or it may be coupled to, or part of, a blade coupling flange in a similar arrangement to the coupling of the pitch gear flange described above. The pitch gear 1157 is releaseably coupled to the hub, with a gear mounting flange 1156 extending radially inward towards the axis of rotation of the pitch bearing. The gear mounting flange 1157 can have the same features as described for the embodiments in which the pitch gear is coupled to the bearing, but it will be appreciated in this example that the portion 91 shown in FIG. 5 will not be required, since the flange can be coupled directly to the hub.

Embodiments have been described in which a pitch gear, or gear ring, is formed of multiple segments, at least the first of which is attachable by releasable fasteners to aid on site repair of worn segments. The pitch gear is preferably formed with the removable segment/portion at the point of manufacture, rather than the removable segment, and corresponding recess or engagement portion into which the detachable segment fits, being formed on site when the pitch gear is within the wind turbine. Because of this, the size of the removable/detachable segments are pre-determined at the point of manufacture or before, based on estimated or anticipated wear of the pitch gear as described above. This facilitates repair of the pitch gear surface throughout its entire operational life within the wind turbine.

The invention claimed is:

1. A system for a wind turbine rotor blade, the system comprising:
   a pitch system comprising a pitch bearing and a wind turbine hub, the pitch bearing being attached to the hub and being attachable to the wind turbine rotor blade; and
   a pitch gear coupled to the pitch system, the pitch gear comprising a first discrete segment and one or more other discrete segments, each segment having a plurality of teeth for engaging with a pinion, wherein the pitch gear is unworn from prior use of the pitch gear in a wind turbine;
   wherein the first discrete segment has a length extending along the pitch gear, the length corresponding to a portion of the pitch gear that will be subjected to higher wear than a remainder of the pitch gear, and
   wherein at least the first segment is held in place by releasable fasteners.

2. The system according to claim 1, wherein the pitch gear is a ring gear having a circumference, and each segment abuts one or more other segments to form a continuous gear surface over at least a portion of the circumference of the pitch gear.

3. The system according to claim 1, wherein the first segment of the gear extends along a smaller circumferential distance than the other segments.

4. The system according to claim 1, wherein the first segment extends along the gear by an amount corresponding to at least a portion of an amount of pitch rotation required of the blade within an operational range.

5. The system according to claim 1, wherein the first segment extends along the gear to cover a segment having an angle of between 20° and 60° or between 30° and 50° or between 30° and 35°.

6. The system according to claim 1, wherein the gear segments are coupled to the bearing or to the hub by removable fasteners.

7. The system according to claim 1, wherein the first segment is comprised of a first material and the other segments are comprised of a different material and wherein the first material has a higher hardness than the material used for the other segments.

8. The system according to claim 1, wherein the pitch gear is coupled to the bearing by a flange; the flange, in use, being connected to the pitch bearing and being arranged to support the gear between the axis of rotation of the bearing and the bearing circumference.

9. A system for a wind turbine rotor blade, the system comprising:
   a pitch system comprising a pitch bearing and a wind turbine hub, the pitch bearing being attached to the hub and being attachable to the wind turbine rotor blade; and
   a pitch gear coupled to the pitch system, the pitch gear comprising a first discrete segment and one or more other discrete segments, each segment having a plurality of teeth for engaging with a pinion;
   wherein at least the first segment is held in place by releasable fasteners and extends along the pitch gear by a predetermined amount;
   wherein the pitch gear is coupled to the bearing by a flange, the flange, in use, being connected to the pitch bearing, being arranged to support the gear between the axis of rotation of the bearing and the bearing circumference, and extending in a direction substantially perpendicular to the axis of rotation of the bearing;
   wherein the flange comprises a first portion and a second portion, and wherein, in use:
      the first portion connects to the bearing and supports the second portion such that the distance between the second portion and the blade tip is smaller than the distance between the bearing and the blade tip, along the bearing axis of rotation; and
      the second portion extends into a space between the circumference of the bearing and the axis of rotation of the pitch bearing.

10. The system according to claim 1, the pitch gear being arranged to engage with two or more pinions such that each pinion may contact different first discrete segments, each first segment corresponding to blade pitch movements within an operational range of the blade.

11. The wind turbine rotor or the wind turbine comprising a system according to claim 1.

12. A pitch sub assembly for a wind turbine rotor blade comprising:
   a pitch bearing being attachable to a wind turbine hub and the wind turbine rotor blade; and
   a pitch gear coupled to the pitch bearing, the pitch gear comprising a first discrete segment and one or more other discrete segments, each segment having a plurality of teeth for engaging with a pinion, wherein the pitch gear is unworn from prior use of the pitch gear in a wind turbine;
   wherein the first discrete segment has a length extending along the pitch gear, the length corresponding to a predetermined high wear region of the pitch gear based on an anticipated operational range of the wind turbine and, in use, the pinion engages only with the first discrete segment when the wind turbine rotor blade is pitched within the anticipated operational range, and
   wherein at least the first segment is held in place by releasable fasteners.

13. A method of manufacturing a system for a wind turbine, the method comprising:
   providing a pitch bearing;
   coupling the pitch bearing to a wind turbine hub;
   providing a pitch gear, the pitch gear having a first discrete segment and at least one further discrete segment, each segment having a plurality of teeth for engaging with a pinion;
   determining a portion of the pitch gear that will be subjected to higher wear than a remainder of the pitch gear;
   forming the first discrete segment to have a length extending along the pitch gear corresponding to the portion of the pitch gear that will be subjected to higher wear than the remainder of the pitch gear; and
   coupling the first segment and the at least one further discrete segment to the hub or pitch bearing, wherein at least the first discrete segment is coupled to the hub or pitch bearing using releasable fasteners.

14. The system according to claim 1, wherein the pitch gear extends around less than an entire circumference of the blade.

* * * * *